(12) United States Patent
Kajimura

(10) Patent No.: US 12,307,680 B2
(45) Date of Patent: May 20, 2025

(54) IMAGE PROCESSING APPARATUS, IMAGE PROCESSING SYSTEM, IMAGE PROCESSING METHOD, LEARNING DEVICE, LEARNING METHOD, AND STORAGE MEDIUM

(71) Applicant: CANON KABUSHIKI KAISHA, Tokyo (JP)

(72) Inventor: Fumihiro Kajimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 469 days.

(21) Appl. No.: 17/752,015

(22) Filed: May 24, 2022

(65) Prior Publication Data

US 2022/0383507 A1   Dec. 1, 2022

(30) Foreign Application Priority Data

May 27, 2021   (JP) .................................. 2021-089252

(51) Int. Cl.
*G06T 7/194* (2017.01)
*G06T 7/11* (2017.01)

(52) U.S. Cl.
CPC ................ *G06T 7/194* (2017.01); *G06T 7/11* (2017.01); *G06T 2207/20081* (2013.01); *G06T 2207/20084* (2013.01)

(58) Field of Classification Search
CPC . G06T 7/194; G06T 7/11; G06T 2207/20081; G06T 2207/20084; G06T 2207/30196; G06T 2207/30221
See application file for complete search history.

(56) References Cited

U.S. PATENT DOCUMENTS

| | | |
|---|---|---|
| 9,881,648 B2 | 1/2018 | Kimura et al. |
| 10,205,277 B2 | 2/2019 | Kimura et al. |
| 10,326,938 B2 | 6/2019 | Kajimura et al. |
| 10,424,343 B2 | 9/2019 | Kimura et al. |
| 10,748,255 B2 | 8/2020 | Kajimura |
| 10,855,027 B2 | 12/2020 | Kimura et al. |

OTHER PUBLICATIONS

Noh, H. et al., "Learning Deconvolution Network for Semantic Segmentation" 2015 IEEE International Conference on Computer Vision (ICCV) (May 2015) pp. 1520-1528.

*Primary Examiner* — Nancy Bitar
*Assistant Examiner* — Dustin Bilodeau
(74) *Attorney, Agent, or Firm* — Carter, DeLuca & Farrell LLP

(57) ABSTRACT

A first region not including an image region where a specific object shows up, and a second region including an image region where the specific object shows up are set to a captured image. A first foreground region indicating a foreground region included in the first region extracted by a first learned model based on the captured image and the first region, and second foreground information indicating a foreground region included in the second region extracted by a second learned model based on the captured image and the second region are obtained. Here, extraction accuracy of the second foreground region extracted by the second learned model based on the captured image and on the second region is higher than extraction accuracy of the second foreground region extracted by the first learned model based on the captured image and on the second region.

17 Claims, 12 Drawing Sheets

FIG.3D  FIG.3E

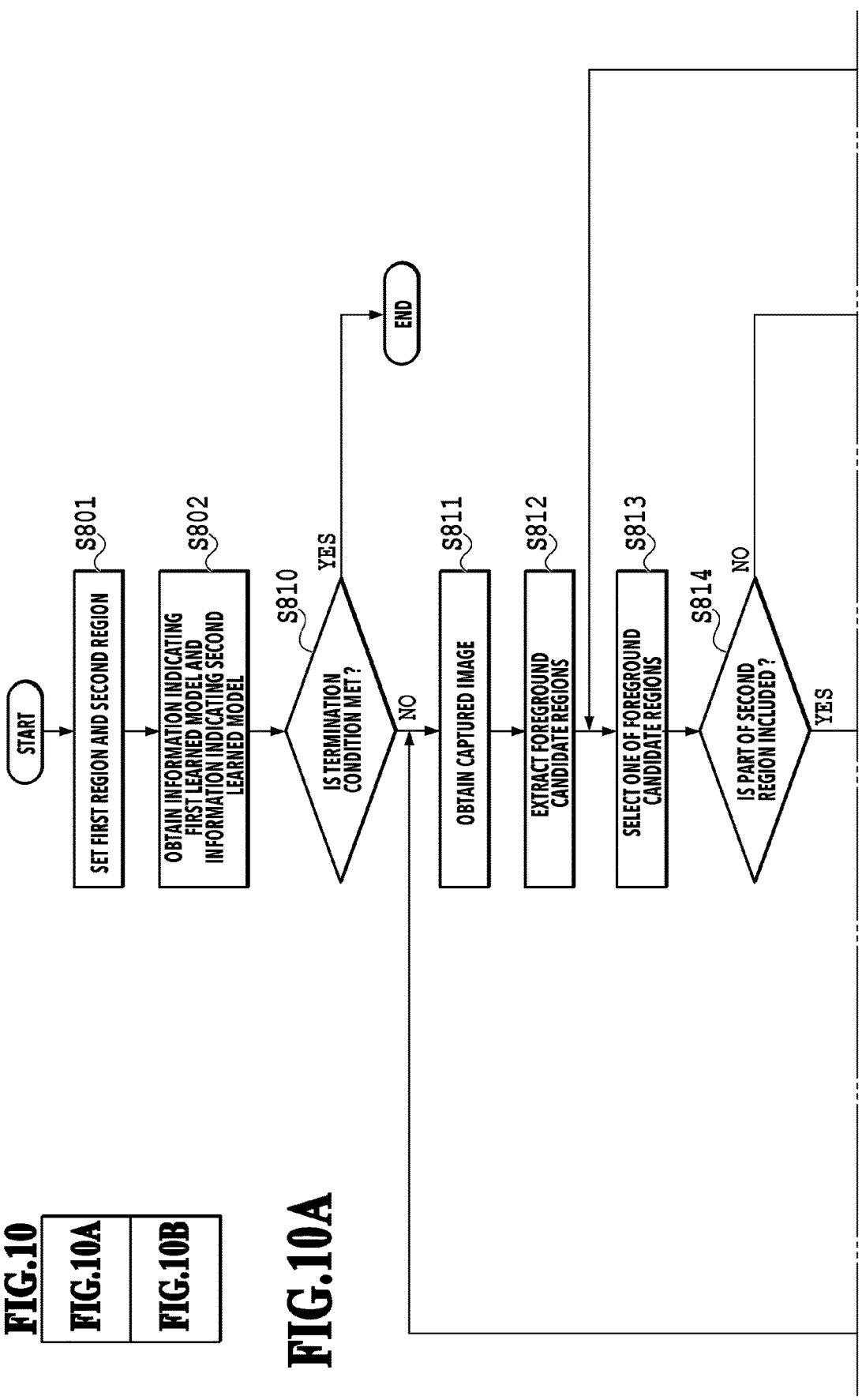

IMAGE PROCESSING APPARATUS, IMAGE PROCESSING SYSTEM, IMAGE PROCESSING METHOD, LEARNING DEVICE, LEARNING METHOD, AND STORAGE MEDIUM

BACKGROUND

Field

The present disclosure relates to an image processing technique for extracting a foreground region from an image.

Description of the Related Art

There is a technique for generating an image (hereinafter referred to as a "virtual viewpoint image"), which is viewed from a virtual viewpoint designated by a user, by using images (hereinafter referred to as "captured images") captured with multiple cameras. The virtual viewpoint image makes it possible to view highlight scenes of games of football, basketball, and the like from various angles, for example.

Foreground extraction is carried out in a case of generating such a virtual viewpoint image, by extracting an image region corresponding to an object from each captured image as a foreground region. A method of extracting a foreground region from a captured image while using a learned model obtained by machine learning has been known as one of foreground extraction methods. A reference titled "Learning deconvolution network for semantic segmentation" (Proceedings of the IEEE International Conference on Computer Vision (ICCV), 2015, p. 1520-1528), written by Hyeonwoo Noh, Seunghoon Hong, and Bohyung Han, discloses a foreground extraction method that combines a convolutional neural network (hereinafter abbreviated as "CNN"), which is a learned model obtained by machine learning, with a deconvolution network.

According to the above-mentioned foreground extraction method disclosed in the reference "Learning deconvolution network for semantic segmentation", extraction accuracy of the foreground region may be deteriorated in a case where part of the image region corresponding to a predetermined moving object such as a person to be extracted as the foreground region overlaps part of the image region corresponding to a specific object. Here, the specific object is an object having a repeated pattern as typified by a goal net. A conceivable mode to improve the extraction accuracy of the foreground region in such a captured image according to the conventional method is to cause a learning model to perform learning by using many captured images that capture a specific object such as a football goal as learning data in the course of generating a learned model by machine learning. However, this learning mode may result in deterioration in extraction accuracy of the foreground region in the captured image where the specific object does not show up, which may be attributed to over-training. Meanwhile, another conceivable mode is to cause a learning model having a complex model structure to perform learning in order to improve the extraction accuracy of the foreground region in the captured image irrespective of whether or not the specific object shows up. However, a learned model obtained by using the learning model having the complex model structure as mentioned above is involves a heavy computation load in the case of extracting the foreground region.

SUMMARY

An image processing apparatus according to the present disclosure includes: one or more hardware processors; and one or more memories storing one or more programs configured to be executed by the one or more hardware processors, the one or more programs including instructions for: setting a first region not including an image region in a captured image where a specific object shows up, and a second region including an image region in the captured image where the specific object shows up; and obtaining a first foreground region indicating a foreground region included in the first region extracted by a first learned model based on the captured image and the first region, and a second foreground region indicating a foreground region included in the second region extracted by a second learned model based on the captured image and the second region; and in which extraction accuracy of the second foreground region extracted by the second learned model based on the captured image and on the second region is higher than extraction accuracy of the second foreground region extracted by the first learned model based on the captured image and on the second region.

Further features of the present disclosure will become apparent from the following description of exemplary embodiments with reference to the attached drawings.

BRIEF DESCRIPTION OF THE DRAWINGS

FIG. 3D is a diagram showing an example of an inputted image to be generated by a generation unit according to the first embodiment, FIG. 3E is a diagram showing an example of a foreground region indicated by foreground information to be obtained from an inference unit by a foreground obtaining unit according to the first embodiment.

FIG. 10 is a diagram showing a relationship between FIGS. 10A and 10B;

FIGS. 10A and 10B are flowcharts showing an example of a processing flow by a image processing apparatus according to a second embodiment.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Figure 1:
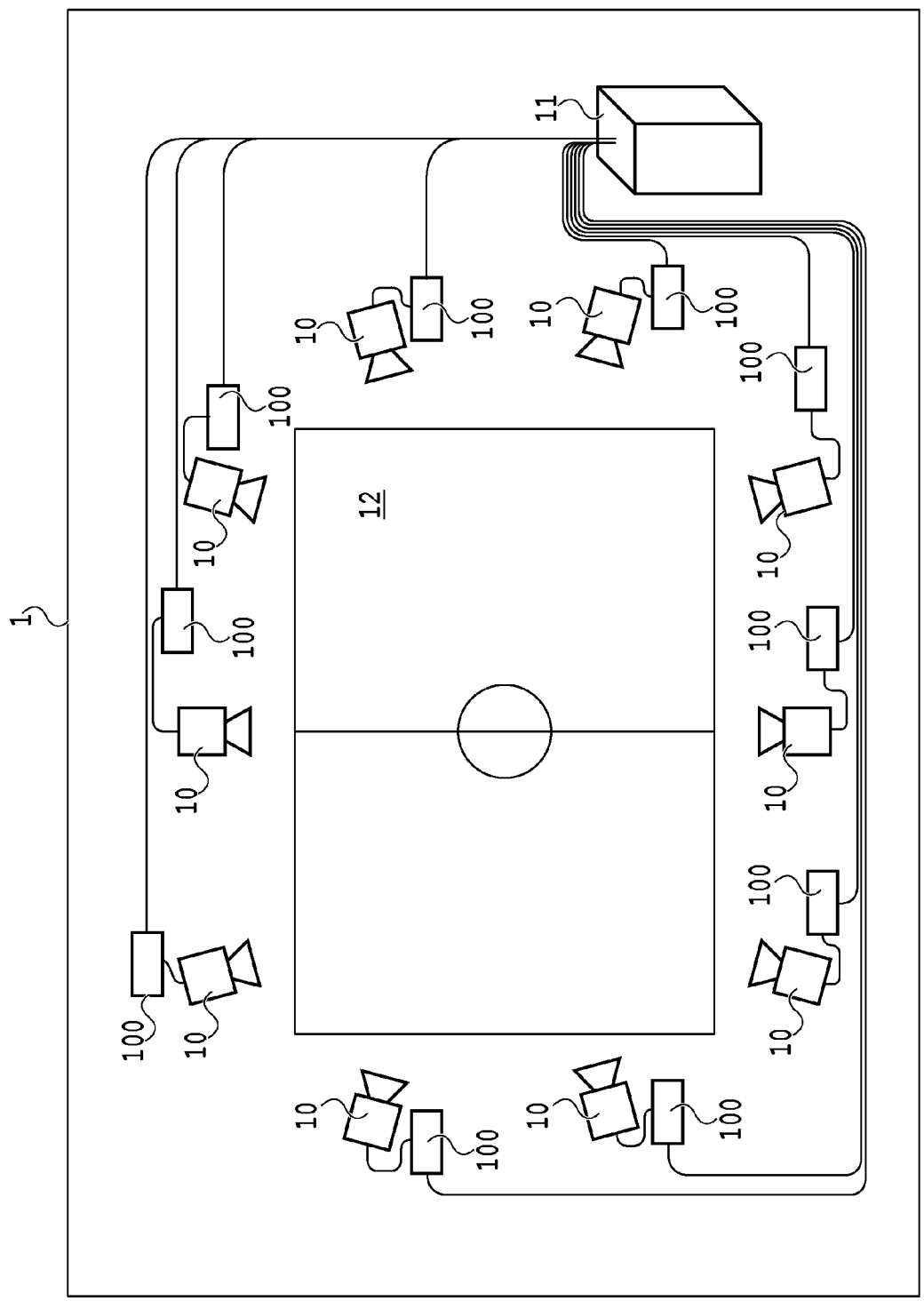
FIG. 1 is a schematic diagram showing an example of a configuration of an image processing system according to a first embodiment.

An image processing apparatus 100 according to a first embodiment will be described below with reference to FIGS. 1 to 8. FIG. 1 is a schematic diagram showing an example of a configuration of an image processing system 1, which applies the image processing apparatus 100 according to the first embodiment. The image processing system 1 includes multiple image capturing devices 10, multiple image processing apparatuses 100, and an image computing server 11.

Each image capturing device 10 is formed from any of a digital video camera, a digital still camera, and the like and is configured to output an image (hereinafter referred to as a "captured image") obtained by capturing an image capturing target object as captured image information. The image capturing devices 10 are arranged so as to surround a field 12 which is the image capturing target object. The captured image information outputted from each of the image capturing devices 10 is inputted to the image processing apparatus 100 corresponding to the relevant image capturing device 10. The following description will be given on the assumption that the image capturing devices 10 correspond to the image processing apparatuses 100 on the one-to-one basis as shown in FIG. 1, and that each image processing apparatus 100 obtains the captured image information outputted from the predetermined one of the image capturing devices 10 corresponding to the relevant image processing apparatus 100. Note that the configuration shown in FIG. 1 is merely an example and one image processing apparatus 100 may be configured to obtain the captured image information outputted from two or more image capturing devices 10.

Each of the image processing apparatuses 100 obtains the captured image information outputted from the corresponding image capturing device 10. The image processing apparatus 100 extracts a foreground region of an object of shooting (hereinafter referred to as the "object") such as a person in the captured image indicated by the captured image information, and generates information (hereinafter referred to as "foreground information") indicating the foreground region. The image processing apparatus 100 outputs the captured image information and the foreground information corresponding to the captured image information to the image computing server 11. Details of the image processing apparatus 100 will be described later.

The image computing server 11 obtains the captured image information and the foreground information outputted from each of the image processing apparatuses 100. The image computing server 11 generates three-dimensional shape data of the object based on the foreground information outputted from the respective image processing apparatuses 100, To be more precise, the image computing server 11 generates the three-dimensional data of the object by using the visual hull technique. A method of generating the three-dimensional data of the object by using the visual hull technique is well known and an explanation thereof will be omitted. The image computing server 11 generates an image (hereinafter referred to as a "virtual viewpoint image), which is viewed from a viewpoint designated by a user or the like, based on the generated three-dimensional shape data and the obtained captured image information, and outputs information indicating the generated virtual viewpoint image. A method of generating the virtual viewpoint image based on the three-dimensional shape data and the captured image is well known and an explanation thereof will be omitted.

Note that the image processing system 1 shown in FIG. 1 represents an example of a star configuration in which the image processing apparatuses 100 linked to the image capturing devices 10 are coupled to the image computing server 11, respectively. The image processing system 1 is not limited to the star configuration. For example, the image processing system 1 may have a configuration in which the image processing apparatuses 100 are connected to one other by using daisy chains and one or more of the image processing apparatuses 100 are coupled to the image computing server 11. Meanwhile, although FIG. 1 illustrates ten image capturing devices 10 and ten image processing apparatuses 100, the numbers of the image capturing devices 10 and the image processing apparatuses 100 may be equal to or below nine or equal to or above eleven. Hence, the numbers thereof are not limited. In the meantime, each image processing apparatus 100 may be embedded as an image processing unit in the corresponding image capturing device 10.

Figure 2:
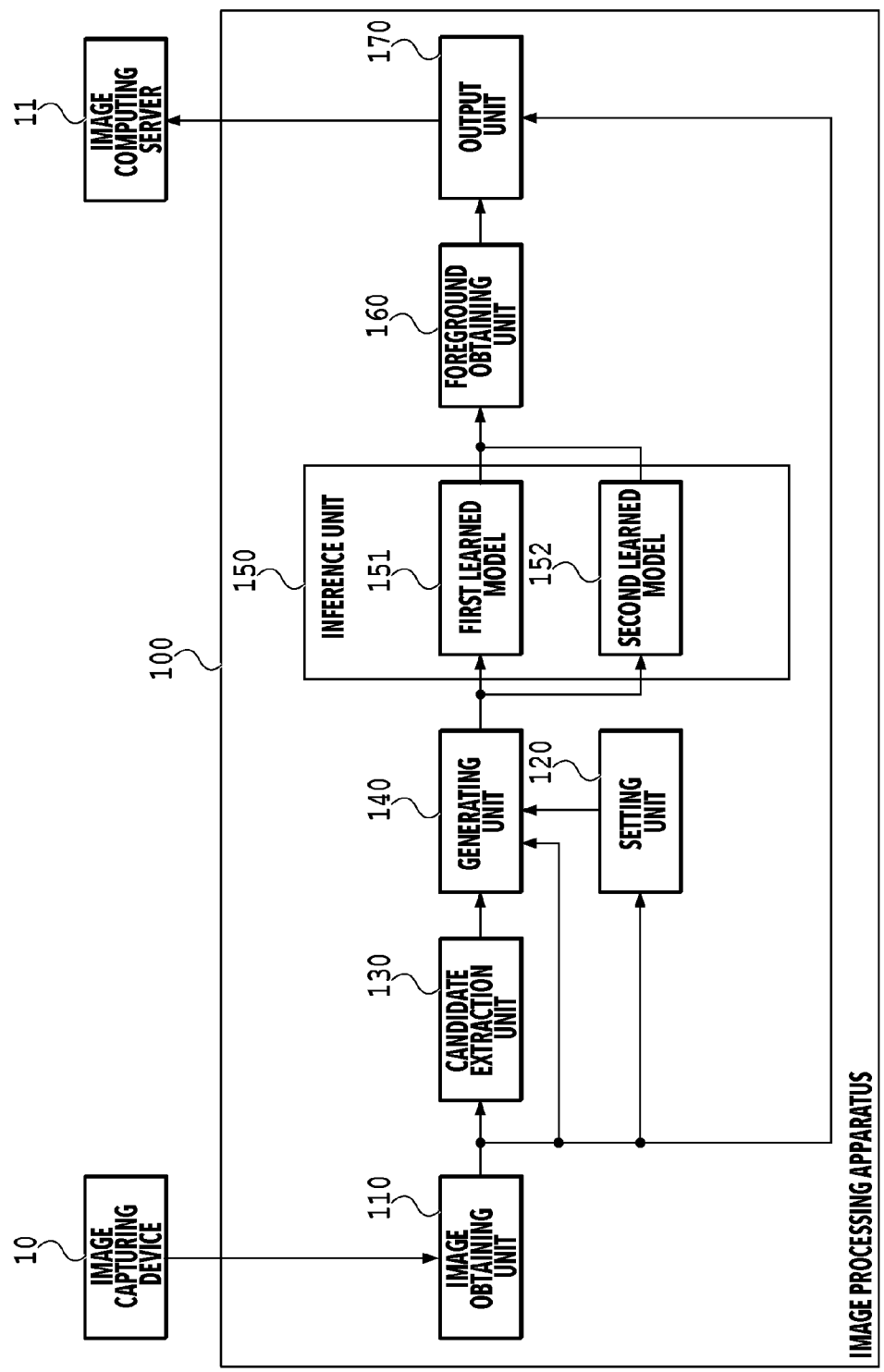
FIG. 2 is a functional block diagram showing an example of a configuration of an image processing apparatus according to the first embodiment.

FIG. 2 is a functional block diagram showing an example of a configuration of the image processing apparatus 100 according to the first embodiment. The image processing apparatus 100 includes an image obtaining unit 110, a setting unit 120, a candidate extraction unit 130, a generating unit 140, an inference unit 150, a foreground obtaining unit 160, and an Output unit 170. Although the first embodiment will be described on the premise that the image processing apparatus 100 includes the generating unit 140 and the candidate extraction unit 130, the generating unit 140 or the candidate extraction unit 130 is not always an indispensable constituent for the image processing apparatus 100. Now, processing by each of the respective constituents provided to the image processing apparatus 100 will be described with reference to FIGS. 2 to 3F. While the description will be given on the assumption that the image processing apparatus 100 is connected one to one to the corresponding image capturing device 10, the single image processing apparatus 100 may be connected to multiple image capturing devices 10 corresponding thereto. In this case, the image processing apparatus 100 includes multiple setting units 120, candidate extraction units 130, generating units 140, inference units 150, and foreground obtaining units 160 that correspond to the multiple image capturing devices 10.

Figure 3A:
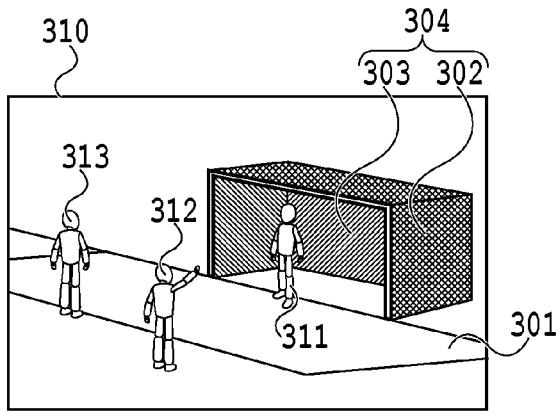
FIG. 3A is a diagram showing an example of a captured image to be obtained by an image obtaining unit according to the first embodiment.

The image obtaining unit 110 obtains the captured image. Specifically, the image obtaining unit 110 obtains the captured image by obtaining the captured image information outputted from the image capturing device 10. The image obtaining unit 110 may obtain the captured image by reading and obtaining the captured image information from a storage device storing the captured image information in advance, which is not illustrated in FIG. 1. FIG. 3A is a diagram showing an example of a captured image 310 to be obtained by the image obtaining unit 110 according to the first embodiment. To be more precise, FIG. 3A shows the captured image 310 obtained by causing a certain image capturing device 10 to capture a football game, for example. Players 311, 312, and 313, a field 301 to be regarded as a background region, and a goal mouth 303 including a goal net 302 (the goal net 302 and the goal mouth 303 will be hereinafter collectively referred to as a "goal 304") show up in the captured image 310. The image obtaining unit 110 outputs the captured image thus obtained to the candidate extraction unit 130, the generating unit 140, and the output unit 170. The following description will be given on the assumption that image regions to be extracted as the foreground regions from the captured image 310 are image regions corresponding to the players 311, 312, and 313, respectively.

Figure 3B:
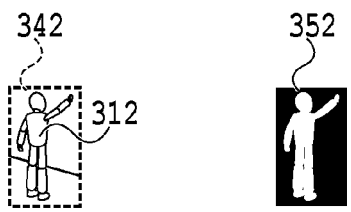
FIG. 3B is a diagram shooing an example of candidate regions to be extracted from the captured image by a candidate extraction unit according to the first embodiment.
Figure 3B:
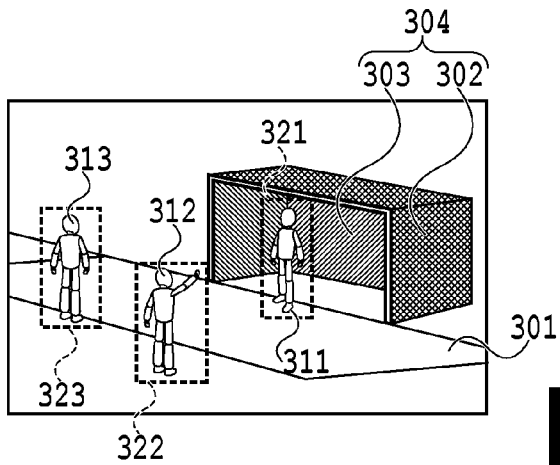

The candidate extraction unit 130 extracts a candidate region to be a candidate for each foreground region (hereinafter simply referred to as the "candidate region") from the captured image, and outputs information indicating the extracted candidate region to the generating unit 140. To be more precise, the candidate extraction unit 130 extracts the candidate region by detecting a moving object showing up in the captured image from the captured image in accordance with a background difference method. For example, the candidate extraction unit 130 extracts a rectangular range that encompasses the outermost periphery of the region of the detected moving object in the captured image as the candidate region. The method of extracting the candidate region by the candidate extraction unit 130 is not limited only to the background extraction method. In the meantime, the shape of the candidate region to be extracted by the candidate extraction unit 130 is not limited to the rectangle as long as the shape of the candidate region can encompass the outermost periphery of the moving object in the captured image. FIG. 3B is a diagram showing an example of candidate regions 321, 322, and 323 to be extracted from the captured image 310 by the candidate extraction unit 130. The candidate regions 321, 322, and 323 are the candidate regions that correspond to the players 311, 312, and 313. Each of the candidate regions 321, 322, and 323 shown as an example in FIG. 3B is a rectangular image. However, the candidate region to be outputted from the candidate extraction unit 130 only needs to be the information that indicates at least the range of the foreground candidate, and its shape does not always have to be the rectangle or its form does not always have to be the image.

The setting unit 120 sets a first region and a second region to the captured image. Here, the second region is a region that includes an image region where a specified object shows up in the captured image (hereinafter referred to as the "specific object"), for example, while the first region is a region that does not include the image region where the specific object shows up in the captured image, for example. Examples of the specific object include an object having a repeated pattern as typified by the goal net 302, an object having the same color combination as that of a uniform worn by any of the players 311, 312, and 313, and the like. The object having the same color combination as that of the uniform is any of a field logo disposed in the field 301, a signboard disposed around the field 301, and the like. The first region and the second region can be designated and determined in advance by a user for each of the image capturing devices 10 or for each of view angles preset for the respective image capturing devices 10, for example. In this case, the setting unit 120 sets the first region and the second region by reading and obtaining information indicating the first region and the second region prepared in advance from a storage device, which is not illustrated in FIG. 1 or 2 but is installed inside or outside the image processing apparatus 100.

The setting unit 120 determines whether or not the specific object shows up in the captured image by analyzing the captured image and identifying objects showing up in the captured image. The setting unit 120 may set the first region and the second region by extracting the region where the specific objects show up in the case where the specific objects show up in the captured image. For example, the setting unit 120 sets the region in the captured image where a specific object shows up as the second region, and sets the region in the captured image where the specific object does not show up as the first region, for example. The setting unit 120 may set the entire region of the captured image as the second region in the case where the specific object shows up in the captured image, and may set the entire region of the captured image as the first region in the case where the specific object does not show up in the captured image. In the meantime, the setting unit 120 may set the first region and the second region as described below in the case where the specific region shows up in the captured image. For example, the setting unit 120 sets the entire region of the captured image as the second region in the case where a ratio of the area of the image region corresponding to the specific object to the area of the entire region of the captured image is larger than a predetermined threshold, and sets the entire region of the captured image as the first region in the case where the ratio is equal to or smaller than the threshold. A method of identifying an object showing up in an image and a method of extracting a region where the object shows up are well known and explanations thereof will be omitted.

Figure 3F:
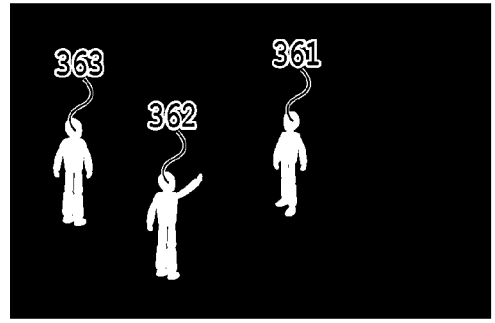
FIG. 3F is a diagram showing an example of a mask image to be generated by the foreground obtaining unit according to the first embodiment.
Figure 3C:
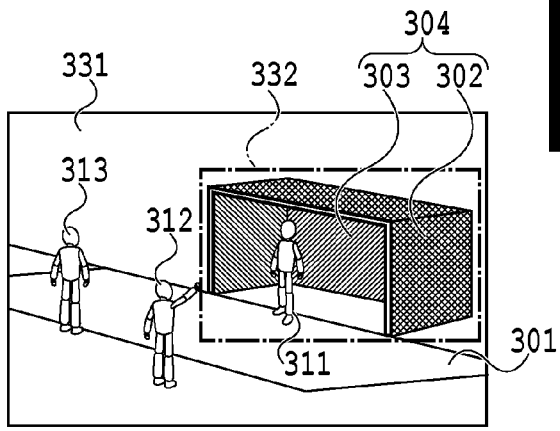
FIG. 3C is a diagram showing an example of a first region and a second region to be set to the captured image by a setting unit according to the first embodiment.

The following description will be given on the assumption that the specific object in the captured image 310 shown in FIG. 3A is the goal 304. FIG. 3C is a diagram showing an example of a first region 331 and a second region 332 to be set to the captured image 310 by the setting unit 120. In FIG. 3C, a rectangular region including an image region where the goal 304 being the specific object shows up is indicated as the second region 332 by using a chain line. Although the second region 332 shown in FIG. 3C is the rectangular region, the second region to be set by the setting unit 120 only needs to be a region that includes at least the image region in the captured image 310 where the goal 304 shows up, and does not always have to be the rectangular region. Note that the first region 331 in FIG. 3C is a whole region out of the entire region of the captured image 310 except the second region 332. Meanwhile, the first region 331 to be set by the setting unit 120 does not always have to be the whole region out of the entire region of the captured image 310 except the second region 332, but may be a partial region out of the entire region of the captured image 310 except the second region 332.

The inference unit 150 is formed from learned models corresponding to results of learning by machine learning. The inference unit 150 infers and extracts the foreground region being the image region corresponding to the object from an image (hereinafter referred to as an "inputted image") inputted as an explanatory variable while using the learned models. Moreover, the inference unit 150 outputs information (foreground information) that indicates the extracted foreground region as a result of inference. To be more precise, the inference unit 150 is formed from a first learned model (hereinafter referred to as a "first learned model 151") and a second learned model (hereinafter referred to as a "second learned model 152"). The inference unit 150 extracts the foreground region from the captured image 310 by using the first learned model 151 or the second learned model 152, and outputs the foreground information to the foreground obtaining unit 160 as the result of inference. Details of the first and second learned models 151 and 152 will be described later. Note that a learning method of causing the first and second learned models 151 and 152 to perform learning is not limited only to the machine learning, and may be a learning method of causing a natural person to perform setting, adjustment, correction, and the like of parameters, for example. The following description will be given on the assumption that the first and second learned models 151 and 152 are the learned models corresponding to the results of learning by the machine learning.

The generating unit 140 generates inputted images to be inputted to the first and second learned models 151 and 152, respectively. To be more precise, the generating unit 140 generates a first image to be inputted to the first learned model 151 as the inputted image by cutting out at least part of the first region 331 from the captured image 310. Meanwhile, the generating unit 140 generates a second image to be inputted to the second learned model 152 as the inputted image by cutting out at least part of the second region 332 from the captured image 310. Moreover, the generating unit 140 outputs the first image and the second image thus generated to the inference unit 150. To be more precise, the generating unit 140 first obtains the captured image 310 outputted from the image obtaining unit 110 as well as the first region 331 and the second region 332 set by the setting unit 120, for example. The generating unit 140 generates the first image by cutting the region corresponding to the first region 331 out of the captured image 310, and outputs the generated first image to the inference unit 150. Meanwhile, the generating unit 140 generates the second image by cutting the region corresponding to the second region 332 out of the captured image 310, and outputs the generated second image to the inference unit 150. The inference unit 150 inputs the first image to the first learned model as the explanatory variable, and inputs the second image to the second learned model as the explanatory variable. The first learned model 151 infers and extracts the foreground region from the first image inputted as the explanatory variable, while the second learned model 152 infers and extracts the foreground region from the second image inputted as the explanatory variable. Each of the first and second learned models 151 and 152 outputs the information (the foreground information) indicating the extracted foreground region to the foreground obtaining unit 160 as the result of inference.

Note that the generating unit 140 is not the indispensable constituent for the image processing apparatus 100. In the case where the image processing apparatus 100 does not include the generating unit 140, the inference unit 150 extracts the foreground regions in the captured image based on the captured image 310, the first region, the second region, and outputs the foreground information. Specifically, in this case, the first learned model 151 extracts the foreground region in the captured image included in the first region based on the captured image and the first region, and outputs the information (the foreground information) indicating the extracted foreground region to the foreground obtaining unit 160. To be more precise, the first learned model 151 cuts the first image out of the captured image based on the captured image and the first region, and extracts the foreground region in the first image based on the first image, for example. Likewise, the second learned model 152 extracts the foreground region in the captured image included in the second region based on the captured image and the second region, and outputs the information (the foreground information) indicating the extracted foreground region to the foreground obtaining unit 160. To be more precise, the second learned model 152 cuts the second image out of the captured image based on the captured image and the second region, and extracts the foreground region in the second image based on the second image, for example.

In the case where the image processing apparatus 100 includes the candidate extraction unit 130, the generating unit 140 cuts out images corresponding to one or more candidate regions (such as the candidate regions 322 and 323), respectively, each of which includes at least part of the first region 331, for example. Thus, the generating unit 140 generates one or more first images. The generating unit 140 sequentially outputs the one or more first images thus generated one by one to the inference unit 150, and the inference unit 150 sequentially inputs the respective first images received from the generating unit 140 to the first learned model 151. Meanwhile, the generating unit 140 cuts out images corresponding to one or more candidate regions such as the candidate region 321), respectively, each of which includes at least part of the second region 332, for example. Thus, the generating unit 140 generates one or more second images. The generating unit 140 sequentially outputs the one or more second images thus generated one by one to the inference unit 150. The inference unit 150 sequentially inputs the respective second images received from the generating unit 140 to the second learned model 152. By inputting the first images and the second images thus generated by the generating unit 140 to the first learned model 151 or the second learned model 152, it is possible to reduce a processing load in extracting the foreground regions on the first and second learned models 151 and 152.

The generating unit 140 may generate the first images and the second images as described below in the case where the image processing apparatus 100 does not include the candidate extraction unit 130. First, the generating unit 140 generates one or more first images by dividing the first image in the captured image 310, which corresponds to the first region 331, into N×M (N and M are integers equal to or above 1, and at least one of which is an integer equal to or above 2) images, for example. The generating unit 140 sequentially outputs the one or more first images thus generated to the inference unit 150, whereby the respective first images are inputted to the first learned model 151. Likewise, the generating unit 140 generates one or more second images by dividing the second image in the captured image 310, which corresponds to the second region 332, into N×M images, for example. The generating unit 140 sequentially outputs the one or more second images thus generated to the inference unit 150, whereby the respective second images are inputted to the second learned model 152. In this way, the first and second learned models 151 and 152 may be caused to infer the foreground regions depending on each of the divided images. This configuration makes it possible to further reduce the processing load in extracting the foreground regions on the first and second learned models 151 and 152 as compared to the case of inputting the entirety of the first images or the second images to the corresponding one of the first and second learned models 151 and 152.

In the case where the image processing apparatus 100 includes the candidate extraction unit 130 but does not include the generating unit 140, the inference unit 150 extracts the foreground regions in the captured image based on the captured image 310, the first region, the second region, and the candidate region, and then outputs the foreground information. Specifically, in this case, the first learned model 151 extracts the foreground region in the captured image included in the first region based on the captured image, the first region, and the candidate region, and outputs the information (the foreground information) indicating the extracted foreground region to the foreground obtaining unit 160. To be more precise, the first learned model 151 cuts one or more first images out of the captured image based on the captured image, the first region, and the candidate region, and extracts the foreground region in each first image based on the first image, for example. Likewise, the second learned model 152 extracts the foreground region in the captured image included in the second region based on the captured image, the second region, and the candidate region, and outputs the information (the foreground information) indicating the extracted foreground region to the foreground obtaining unit 160. To be more precise, the second learned model 152 cuts one or more second images out of the captured image based on the captured image, the second region, and the candidate region, and extracts the foreground region in each second image based on the second image, for example.

FIG. 3D is a diagram showing an example of an inputted image 342 that the generating unit 140 outputs to the inference unit 150. The inputted image 342 shown as an example in FIG. 3D is an image obtained by causing the generating unit 140 to cut the image region corresponding to the candidate region 322 out of the captured image 310. The inputted image 342 is the first image since the candidate region 322 shown as an example in FIG. 3D includes at least part of the first region 331. Accordingly, the inference unit 150 inputs the inputted image 342 to the first learned model 151 as the explanatory variable.

The foreground obtaining unit 160 obtains the foreground information outputted from the inference unit 150 as the results of inference, that is, the foreground information outputted from the first and second learned models 151 and 152 as the results of inference, thus obtaining the foreground regions in the captured image 310 based on the foreground information. Specifically, the foreground obtaining unit 160 obtains the foreground information outputted from the first learned model 151 as the result of inference, thus obtaining the foreground region in the first region 331. In the meantime, the foreground obtaining unit 160 obtains the foreground information outputted from the second learned model 152 as the result of inference, thus obtaining the foreground region in the second region 332. FIG. 3E is a diagram showing an example of a foreground region 352 indicated by the foreground information to be obtained from the inference unit 150 by the foreground obtaining unit 160. Specifically, the foreground region 352 shown as an example in FIG. 3E corresponds to the foreground information outputted from the first learned model 151 in the case where the inference unit 150 inputs the inputted image 342 as the explanatory variable. To be more precise, the foreground obtaining unit 160 obtains the foreground information as a binarized image such as the foreground region 352 shown as an example in FIG. 3E, in which the foreground regions being the regions corresponding to the objects (the players) are expressed by using white pixels while the remaining region (the background region) is expressed by using black pixels, for example.

The foreground obtaining unit 160 may obtain the foreground information outputted from the first learned model 151 and the second learned model 152, respectively, and may generate a mask image by arranging the multiple foreground regions corresponding to the foreground information in a single image. FIG. 3F is a diagram showing an example of a mask image 360 to be generated by the foreground obtaining unit 160. The mask image 360 shown as an example in FIG. 3F corresponds to the entire image region of the captured image 310, which is the binarized image in which the foreground regions are expressed by using the white pixels while the background region is expressed by using the black pixels. FIG. 3F indicates foreground regions 361, 362, and 363 as the foreground regions corresponding to the players 311, 312, and 313.

The output unit 170 outputs information indicating the foreground regions obtained by the foreground obtaining unit 160. Specifically, the output unit 170 integrates the information indicating the foreground regions obtained by the foreground obtaining unit 160 with the information indicating the captured image 310 outputted from the image obtaining unit 110, and outputs the integrated information to the image computing server 11.

Figure 4A:
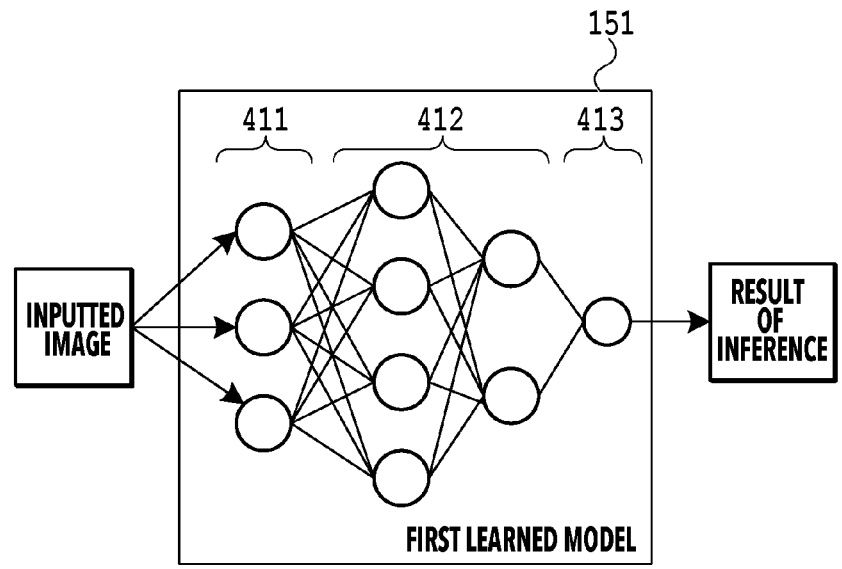
FIG. 4A is a configuration diagram showing an example of a configuration of a first learned model according to the first embodiment.
Figure 4B:
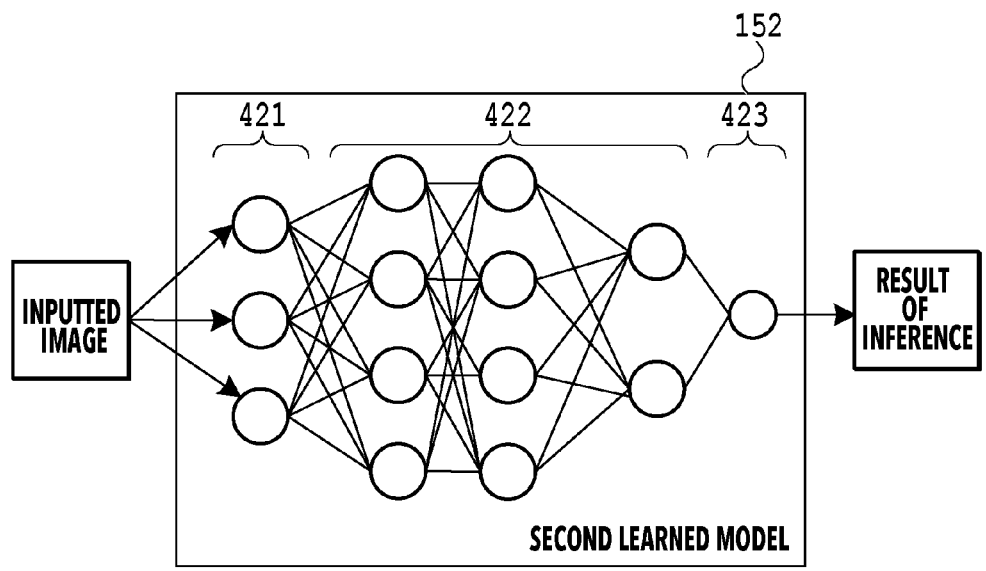
FIG. 4B is a configuration diagram showing an example of a configuration of a second learned model according to the first embodiment.

The first and second learned models 151 and 152 will be described with reference to FIGS. 4A and 4B. FIG. 4A is a configuration diagram showing an example of a configuration of the first learned model 151 according to the first embodiment, and FIG. 4B is a configuration diagram showing an example of a configuration of the second learned model 152 according to the first embodiment. As shown in FIG. 4A as an example, the first learned model 151 is formed from a neural network 410 that includes an input layer 411, an intermediate layer 412 having one or more sub-layers, and an output layer 413, for example. Moreover, each of the input layer 411, the sub-layers of the intermediate layer 412, and the output layer 413 includes one or more neurons each indicated with a circle in FIG. 4A. Likewise, as shown in FIG. 4B as an example, the second learned model 152 is formed from a neural network that includes an input layer 421, an intermediate layer 422 having one or more sub-layers, and an output layer 423, for example. Moreover, each of the input layer 421, the sub-layers of the intermediate layer 422, and the output layer 423 includes one or more neurons each indicated with a circle in FIG. 4B. The second learned model 152 may be formed from the neural network 410 which is the same as the first learned model 151 that includes the input layer 411, the intermediate layer 412, and the output layer 413 as shown in FIG. 4A as an example.

Specifically, each of the first and second learned models 151 and 152 is formed from a convolutional neural network (hereinafter abbreviated as "CNN") that represents one of neural networks. Each of the first and second learned models 151 and 152 may be formed by a combination of the CNN and a deconvolution network as disclosed in "Learning deconvolution network for semantic segmentation" (Proceedings of the IEEE International Conference on Computer Vision (ICCV), 2015, p. 1520-1528), written by Hyeonwoo Noh, Seunghoon Hong, and Bohyung Han. Note that the CNN is merely an example and each of the first and second learned models 151 and 152 may be formed from a neural network other than the CNN. Meanwhile, each of the first and second learned models 151 and 152 is not limited to the structure formed from the neural network as long as the learned model is a learned model that corresponds to a result of learning accomplished by the learning.

Each of the first and second learned models 151 and 152 infers the foreground region from the inputted image inputted as the explanatory variable, and outputs the foreground information as the result of inference. The first and second learned models 151 and 152 are each configured to infer the foreground region, but are different models from each other. A method of generating the first and second learned models 151 and 152 will be described below. For example, the first and second learned models 151 and 152 are generated by a learning device.

Figure 5:
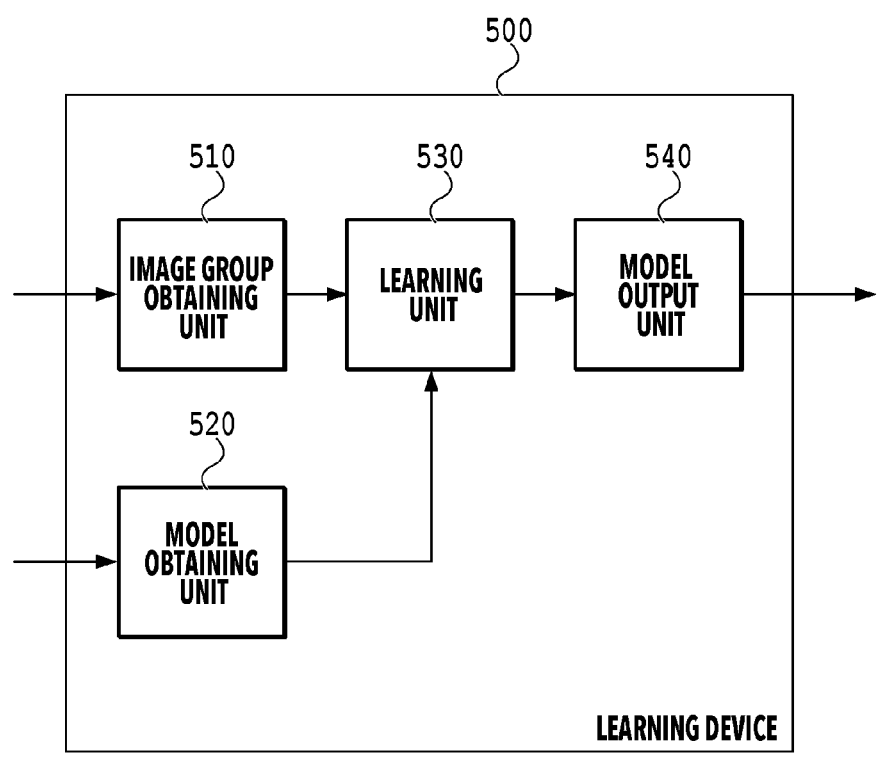
FIG. 5 is a functional block diagram showing an example of a configuration of a learning device according to the first embodiment.

A configuration of a learning device 500 that generates the first and second learned models 151 and 152 will be described with reference to FIG. 5. FIG. 5 is a functional block diagram showing an example of the configuration of the learning device 500 according to the first embodiment. The learning device 500 includes an image group obtaining unit 510, a model obtaining unit 520, a learning unit 530, and a model output unit 540.

The image group obtaining unit 510 obtains an image group including multiple images as learning data. Specifically, the image group obtaining unit 510 obtains a first group of images (hereinafter referred to as a "first image group") as first data for learning (hereinafter referred to as "first learning data"). Meanwhile, the image group obtaining unit 510 obtains a second group of images (hereinafter referred to as a "second image group") as second data for learning (hereinafter referred to as "second learning data"). For example, the image group obtaining unit 510 obtains the image group by reading the images corresponding to the first or second image group from a storage device installed inside or outside any of the image processing apparatus 100 and the learning device 500. Here, the first image group and the second image groups are image groups that are different from each other. Specifically, the second image group to be obtained as the second learning data includes more images where the specific object shows up as compared to the first image group to be obtained as the first learning data. In the meantime, the second image group has a ratio of pieces of the images where the specific object shows up, which is larger than a predetermined ratio, for example. Here, the ratio of pieces of the images where the specific object shows up is a ratio of a total of the images where the specific object shows up relative to a total of the images included in the second image group, for example.

The model obtaining unit 520 obtains a learning model either prior to learning or in the course of learning. Specifically, the model obtaining unit 520 obtains a first learning model (hereinafter referred to as a "first learning model"), which turns into the first learned model 151 corresponding to the result of learning accomplished by the learning by means of the machine learning. Moreover, the model obtaining unit 520 obtains a second learning model (hereinafter referred to as a "second learning model"), which turns into the second learned model 152 corresponding to the result of learning accomplished by the learning by means of the machine learning.

The learning unit 530 causes each learning model to perform learning by means of the machine learning while using the image group as the learning data, thereby generating the learned model which can infer the foreground region in the inputted image that is inputted as the explanatory variable. Specifically, the learning unit 530 generates the first learned model 151 by causing the first learning model to perform the machine learning while using the first image group as the first learning data. Meanwhile, the learning unit 530 generates the second learned model 152 by causing the second learning model to perform the machine learning while using the second image group as the second learning data. The above-described second learned model 152 can perform the inference of the foreground region in the inputted image at high accuracy as compared to the first learned model 151 in the case where the inputted image where the specific object shows up is inputted as the explanatory variable. In other words, extraction accuracy of the foreground region to be extracted by the second learned model based on the inputted image where the specific object shows up is higher than extraction accuracy of the foreground region to be extracted by the first learned model based on the same inputted mage.

For example, the learning unit 530 generates the first and second learned models 151 and 152 by causing the first learning model and the second learning model to perform learning by means of the machine learning in accordance with supervised learning. In the case where the learning unit 530 carries out the supervised learning, training data corresponding to the respective images in the first image group and training data corresponding to the respective images in the second image group are obtained by the image group obtaining unit 510, for example. The machine learning method in accordance with the supervised learning is well known and an explanation thereof will be omitted. Note that the machine learning method to be carried out by the learning unit 530 is not limited only to the machine learning in accordance with the supervised learning, but may also be machine learning in accordance with unsupervised learning such as reinforcement learning.

The first learning model and the second learning model may be different from each other or the same as each other. In the case where the first learning model and the second learning model are the same as each other, the first learned model 151 and the second learned model 152 have the same configuration, namely, the configuration as shown in FIG. 4A as an example, for instance.

On the other hand, in the case where the first learning model and the second learning model are different from each other, there is the following difference between the first learning model and the second learning model. Specifically, in the case of causing the second learning model to perform the machine learning while using the image where the specific object shows up as the learning data, for example, the second learning model is set such that a value of a loss function becomes smaller than that in the case of causing the first learning model to perform the same machine learning. The second learned model 152 generated by causing the above-described second learning model to perform the machine learning is able to infer the foreground region in the inputted image at high accuracy as compared to the first learned model 151 in the case where the inputted image where the specific object shows up is inputted as the explanatory variable.

Alternatively, the second learning model may include a larger number of the sub-layers in the intermediate layer or a larger number of the neurons in the intermediate layer as compared to the first learning model. As a consequence, the second learned model 152 has a larger number of the sub-layers in the intermediate layer or a larger number of the neurons in the intermediate layer as compared to the first learned model 151. The above-described second learned model 152 is able to infer the foreground region in the inputted image at high accuracy as compared to the first learned model 151 in the case where the inputted image where the specific object shows up is inputted as the explanatory variable.

The model output unit 540 outputs the first and second learned models 151 and 152. To be more precise, the model output unit 540 outputs the first and second learned models 151 and 152 to the storage device installed inside or outside any of the image processing apparatus 100 or the learning device 500, for example. The model output unit 540 causes the storage device to store the outputted first and second learned models 151 and 152. The inference unit 150 included in the image processing apparatus 100 performs inference based on the first and second learned models 151 and 152 by reading the first and second learned models 151 and 152 stored in the storage device in advance.

Processing by the respective units included in the image processing apparatus 100 is carried out by hardware such as an application specific integrated circuit (ASIC) embedded in the image processing apparatus 100. The processing may be carried out by other hardware such as a field programmable gate array (FPGA). Alternatively, the processing may be carried out by software that employs a central processor unit (CPU) or a graphic processor unit (GPU) together with a memory.

Figure 6A:
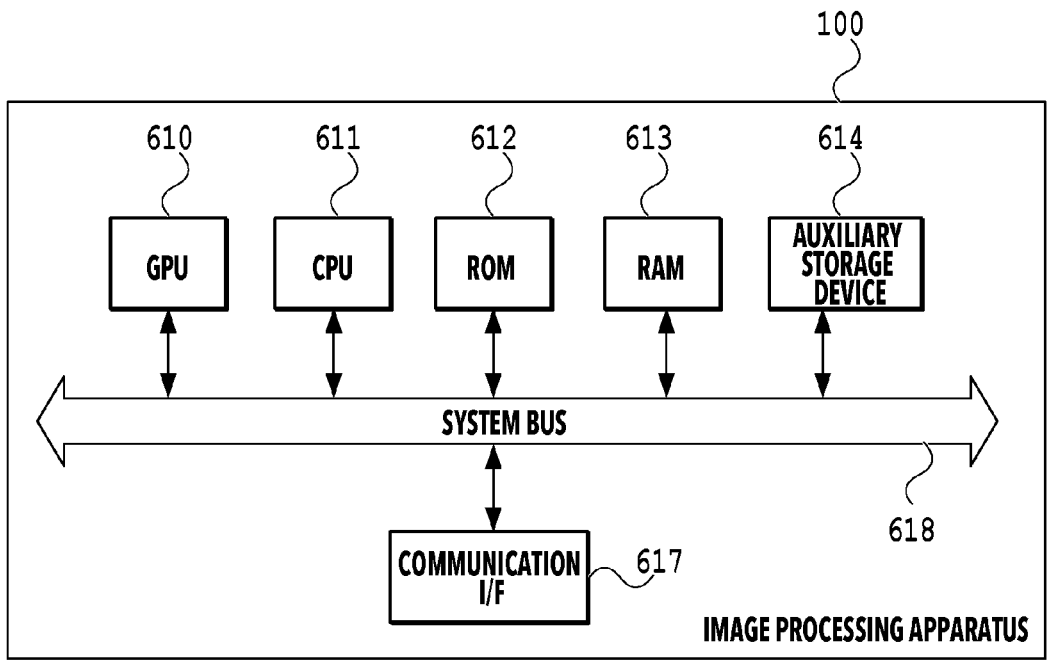
FIG. 6A is a block diagram showing an example of a hardware configuration of the image processing apparatus according to the first embodiment.
Figure 6B:
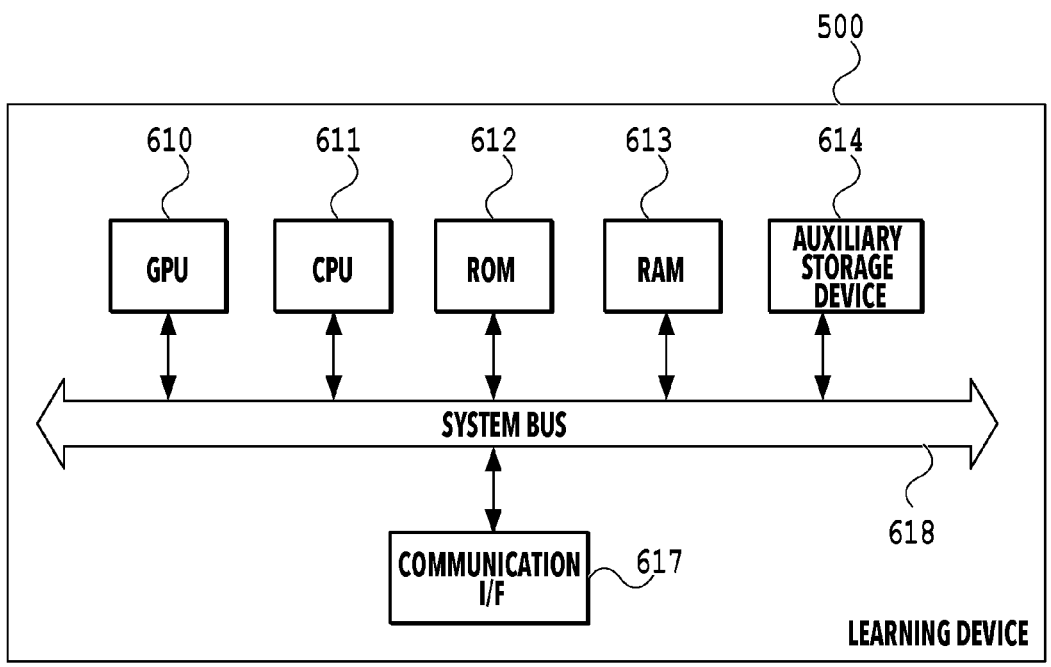
FIG. 6B is a block diagram showing an example of a hardware configuration of the learning device according to the first embodiment.

Hardware configurations of the image processing apparatus 100 and the learning device 500 in the case where the respective units included in the image processing apparatus 100 and the learning device 500 are operated in the form of software will be described with reference to FIGS. 6A and 6B. FIG. 6A is a block diagram showing an example of a hardware configuration of the image processing apparatus 100 according to the first embodiment. FIG. 6B is a block diagram showing an example of a hardware configuration of the learning device 500 according to the first embodiment. Each of the image processing apparatus 100 and the learning device 500 is formed from a computer, for example. As shown in FIG. 6A or 6B as an example, the computer includes a GPU 610, a CPU 611, a ROM 612, a RAM 613, an auxiliary storage device 614, a communication I/F 617, and a system bus 618.

The CPU 611 controls the computer by using programs or data stored in any of the ROM 612, the RAM 613, and the like. Thus, the CPU 611 causes the image processing apparatus 100 shown in FIG. 2 or the learning device 500 shown in FIG. 5 to function as the respective units included therein. As with the CPU 611, the GPU 610 controls the computer by using the programs or the data stored in any of the ROM 612, the RAM 613, and the like. The GPU 610 can perform computations more efficiently by subjecting more pieces of data to parallel processing. In the case of carrying out the machine learning repeatedly for several times by using the learning model such as in deep learning, it is effective to perform arithmetic processing in the machine learning by use of the GPU 610. Meanwhile, in the case of carrying out the arithmetic processing by using the learned model corresponding to a result of learning by the deep learning, it is effective to perform arithmetic processing by use of the GPU 610.

Accordingly, the CPU 611 and the GPU 610 carry out the processing by the inference unit 150 included in the image processing apparatus 100 and the processing by the learning unit 530 included in the learning device 500, for example. Specifically, the inference based on the first and second learned models 151 and 152 by the inference unit 150 included in the image processing apparatus 100 is carded out by computation executed by the CPU 611 and the GPU 610 in cooperation, for example. Meanwhile, the processing by the units other than the inference unit 150 which are included in the image processing apparatus 100 and the processing by the units other than the learning unit 530 which are included in the learning device. 500 may be computed by any one of the CPU 611 and the GPU 610 only. Alternatively, each of the image processing apparatus 100 and the learning device 500 may include one or more pieces of dedicated hardware aside from the CPU 611 or the GPU 610, and the dedicated hardware may execute at least part of the processing by the CPU 611 or the GPU 610. Examples of the dedicated hardware include an ASIC, a FPGA, a digital signal processor (DSP), and the like.

The ROM 612 stores programs and the like which do not require changes. The RAM 613 temporarily stores programs or data supplied from the auxiliary storage device 614, or data and the like supplied from the outside through the communication I/F 617. The auxiliary storage device 614 is formed from a hard disk drive, for example, and stores various data such as image data and voice data. The communication I/F 617 is used for communication between the image processing apparatus 100 and an external device such as the image computing server 11 as well as communication between the learning device 500 with the external device. In the case where the image processing apparatus 100 or the learning device 500 is connected to the external device by wire, for example, a communication cable is connected to the communication I/F 617. The communication I/F 617 is provided with an antenna in the case where the image processing apparatus 100 or the learning device 500 has a function to communicate wirelessly with the external device. The system bus 618 transmits information by connecting the respective units in the image processing apparatus 100 to one another and connecting the respective units in the learning device 500 to one another.

Figure 7:
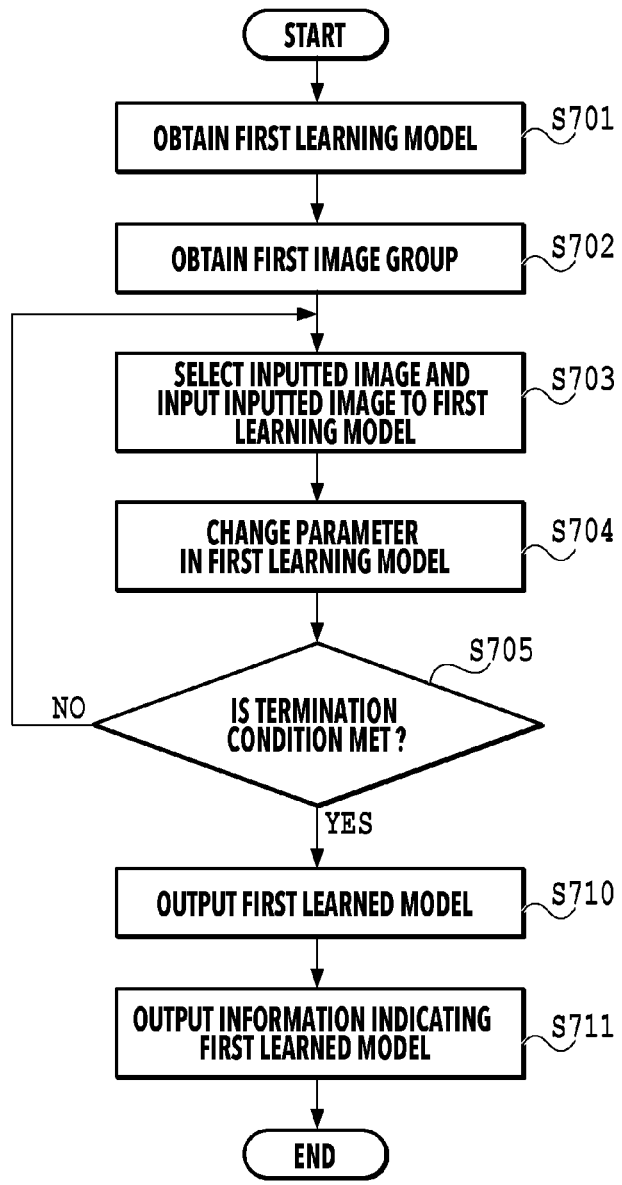
FIG. 7 is a flowchart showing an example of a processing flow by the learning device according to the first embodiment.

An operation of the learning device 500 will be described with reference to FIG. 7. FIG. 7 is a flowchart showing an example of a processing flow by the learning device 500 according to the first embodiment. With reference to FIG. 7, a description will be given below of an operation of the learning device 500 to generate the first learned model 151 as an example. Note that an operation of the learning device 500 to generate the second learned model 152 is the same as the operation of the learning device 500 to generate the first learned model 151, or the same as the operation by replacing the first with the second to be more precise. Accordingly, explanations of the latter operation will be omitted herein. In the following description, a sign "S" means a step.

First, in S701, the model obtaining unit 520 obtains the first learning model either prior to learning or in the course of learning. Then, in S702, the image group obtaining unit 510 obtains the first image group. Next, in S703, the learning unit 530 selects the inputted image to be inputted to the first learning model from the images in the first image group, and inputs the selected inputted image to the first learning model. Then, in S704, the learning unit 530 changes a parameter in the first learning model by comparing the foreground information outputted from the first learning model with the training data corresponding to the inputted image, thereby causing the first learning model to perform the learning by means of the machine learning, Next, in S705, the learning unit 530 determines whether or not a condition (hereinafter referred to as a "termination condition") for terminating the machine learning is met. Here, examples of the termination condition include an event of selecting all the images in the first image group, an event of a passage of a predetermined period after starting the machine learning, an event of selection and input of a predetermined number of the images after starting the machine learning, and so forth.

In the case where the learning unit 530 determines that the termination condition is not met, the learning device 500 returns to the processing in S703 and repeatedly executes the processing from S703 to S705 until the learning unit 530 determines that the termination condition is met. In the case where the learning unit 530 determines that the termination condition is met, the learning unit 530 outputs the first learning model as the first learned model 151 to the model output unit 540 in S710. After S710, the model output unit 540 outputs the information indicating the first learned model 151 to the external device such as the image processing apparatus 100 in S711. After S711, the learning device 500 terminates the processing of the flowchart shown in FIG. 7. Note that the order of the processing in S701 and in S702 is discretionary.

Figure 8:
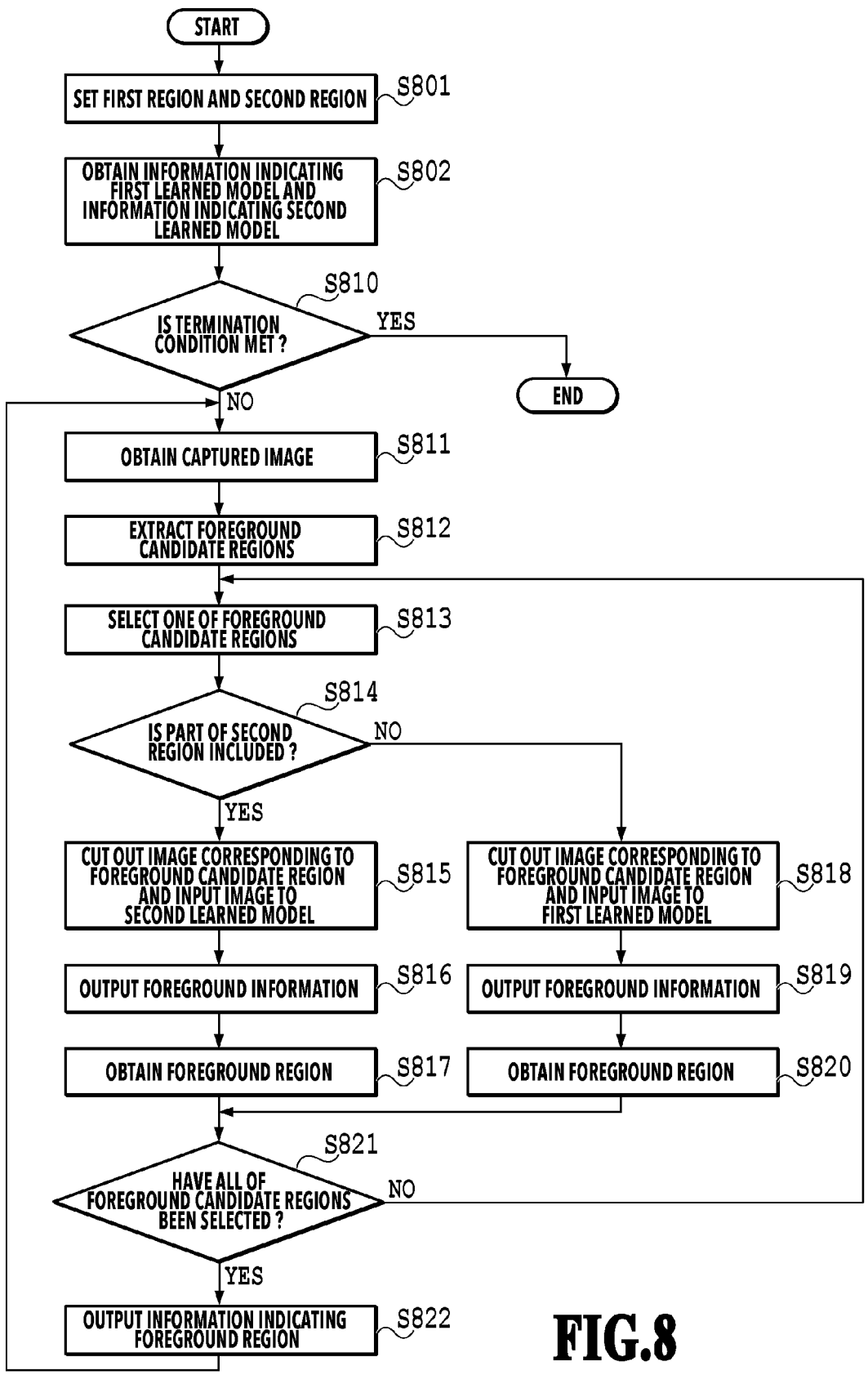
FIG. 8 is a flowchart showing an example of a processing flow by the image processing apparatus according to the first embodiment.

An operation of the image processing apparatus 100 will be described with reference to FIG. 8. FIG. 8 is a flowchart showing an example of a processing flow by the image processing apparatus 100 according to the first embodiment. First, in S801, the setting unit 120 sets the first region 331 and the second region 332. Then, in S802, the inference unit 150 obtains the information indicating the first learned model 151 and the information indicating the second learned model 152. After S802, the image processing apparatus 100 repeatedly executes the processing from S810 to S822 until a predetermined termination condition is met. Here, examples of the termination condition include an event of turning off a power supply to the image processing apparatus 100, an event of absence of obtaining the captured image information from the image capturing device 10 over a predetermined period, an event of a change in view angle of the image capturing device 10, and so forth. Note that the order of the processing in S801 and in S802 is discretionary. After S802, the image processing apparatus 100 determines whether or not the termination is met in S810.

In the case where it is determined that the termination condition is met, the image processing apparatus 100 terminates the processing of the flowchart shown in FIG. 8. In the case where it is determined that the termination condition is not met, the image obtaining unit 110 obtains the captured image 310 in S811. After S811, the candidate extraction unit 130 extracts one or more candidate regions 321, 322, and 323 in S812. For example, the candidate extraction unit 130 provides corresponding index numbers that make the candidate regions 321, 322, and 323 identifiable from one another. After S812, the generating unit 140 selects one of the extracted candidate regions 321, 322, and 323 in S813. The generating unit 140 selects one of the candidate regions not having been selected yet, which corresponds to the smallest index number, for example. The image processing apparatus 100 repeatedly executes the processing from S813 to S821 until it is determined that all of the candidate regions 321, 322, and 323 have been selected in S821 to be described later. After S813, the generating unit 140 determines whether or not at least part of the selected candidate region includes at least part of the second region 332 in S814.

In the case where it is determined that at least part of the candidate region includes at least part of the second region 332, the generating unit 140 cuts an image corresponding to the candidate region as the second image out of the captured image 310 and outputs this image to the inference unit 150 in S815. Moreover, the inference unit 150 inputs this image to the second learned model 152 as the explanatory variable. After S815, the second learned model 152 in the inference unit 150 infers the foreground region from this image and outputs the foreground information as the result of inference in S816. After S816, the foreground obtaining unit 160 obtains the foreground information outputted from the inference unit 150, thus obtaining the foreground region of the image in S817. In the case where it is determined that at least part of the candidate region does not include at least part of the second region 332, the generating unit 140 cuts an image corresponding to the candidate region as the first region out of the captured image 310 and outputs this image to the inference unit 150 in S818. Moreover, the inference unit 150 inputs this image to the first learned model 151 as the explanatory variable. After S818, the first learned model 151 in the inference unit 150 infers the foreground region from this image and outputs the foreground information as the result of inference in S819. After S819, the foreground obtaining unit 160 obtains the foreground information outputted from the inference unit 150, thus obtaining the foreground region of the image in S820. After S837 or S820, the generating unit 140 determines whether or not all of the candidate regions 321, 322, and 323 have been selected in S821.

In the case where it is determined that all of the candidate regions 321, 322, and 323 have not been selected, the image processing apparatus 100 returns to the processing in S813 and repeatedly executes the processing from S813 to S821. In the case where it is determined that all of the candidate regions 321, 322, and 323 have been selected, the output unit 170 outputs, in S822, the information indicating the foreground region obtained in S817 or S820. After S822, the image processing apparatus 100 returns to the processing in S810 and repeatedly executes the processing from S810 to S822.

In the case where at least part of the candidate region includes in at least part of the second region 332 as described above, the image processing apparatus 100 infers the foreground region while inputting the image corresponding to the candidate region to the second learned model 152 as the explanatory variable. Thus, it is possible to extract the foreground region at high accuracy. Meanwhile, in the case where the candidate region includes the first region 331 as described above, it is possible to extract the foreground region at high accuracy by inferring the foreground region while inputting the image corresponding to the candidate region to the first teamed model 151 as the explanatory variable. As a consequence, the image processing apparatus 100 can extract the foreground region from the captured image 310 at high accuracy while suppressing an increase in computation load in the case of extracting the foreground region irrespective of whether or not the specific object shows up in the captured image 310.

So far, the description has been given of the example in which the setting unit 120 sets the two regions, namely, the first region 331 and the second region 332. Instead, the setting unit 120 may be configured to set three or more regions. Specifically, the second region 332 is a region where a first specific object shows up, a third region is a region where a second specific object different from the first specific object shows up, and the first region 331 is a region where neither first or nor second specific object shows up, for example. In this case, the inference unit 150 is formed from the first learned model 151 to which the first image corresponding to the first region 331 is inputted, the second learned model 152 to which the second image corresponding to the second region 332 is inputted, and a third learned model to which an image corresponding to the third region is inputted, and so forth.

As described above, the first region 331 and the second region 332 can be predetermined depending on each image capturing device 10 or on the view angle preset for each image capturing device 10. That is to say, in the case where the image capturing device 10 and the image processing apparatus 100 are disposed around the field 301, it is determined whether or not the specific object shows up in the captured image 310 obtained by the image capturing device 10. In other words, it is also determined whether or not the image processing apparatus 100 corresponding to the image capturing device 10 is supposed to infer the foreground region based on the second learned model 152. The second learned model 152 involves a larger processing load in the case of inferring the foreground region as compared to the case of the first learned model 151. For this reason, the image processing apparatus 100 that infers the foreground region based on the second learned model 152 is prone to cause a large amount of heat generation due to its increased power consumption as compared to the image processing apparatus 100 that does not carry out the inference. Accordingly, regarding the image processing apparatus 100 which is predetermined to infer the foreground region based on the second learned model 152, it is desirable to cool the relevant image processing apparatus 100 by blowing air while using an air cooling device such as a fan. By cooling the image processing apparatus 100 with the cooling device, the GPU 610, the CPU 611, or the like included in the image processing apparatus 100 is cooled down, whereby arithmetic processing efficiency is improved. As a consequence, it is possible to reduce power consumption by the image processing apparatus 100 and thus to reduce costs. The cooling device may be configured to cool down the image processing apparatus 100 by air cooling or may be configured to cool down the image processing apparatus 100 by a method other than air cooling.

So far, the mode in which the image processing apparatus 100 includes the inference unit 150 has been described above. Nevertheless, the image processing apparatus 100 does not always have to include the inference unit 150, namely, the functional block to infer the foreground region based on the first and second learned models 151 and 152. In the case where the image processing apparatus 100 does not include the inference unit 150, each of the image processing system 1 and the image processing apparatuses 100 may be configured as described below, for example. The image processing system 1 includes an external device such as a cloud server not illustrated in FIG. 1, which is the external device provided with a functional block corresponding to the inference unit 150. The generating unit 140 outputs the first image and the second image to the functional block provided to the external device through the communication I/F 617. The functional block provided to the external device inputs the first image to the first learned model 151 as the explanatory variable and inputs the second image to the second learned model 152 as the explanatory variable. The foreground obtaining unit 160 obtains the foreground information outputted from the first and second learned models 151 and 152 in the functional block provided to the external device through the communication I/F 617. The above-described configuration reduces the arithmetic processing load on the image processing apparatus 100. Accordingly, it is possible to apply a component such as an inexpensive component having a low arithmetic processing capacity to the hardware such as the GPU 610 or the CPU 611 included in the image processing apparatus 100.

Second Embodiment

Figure 9:
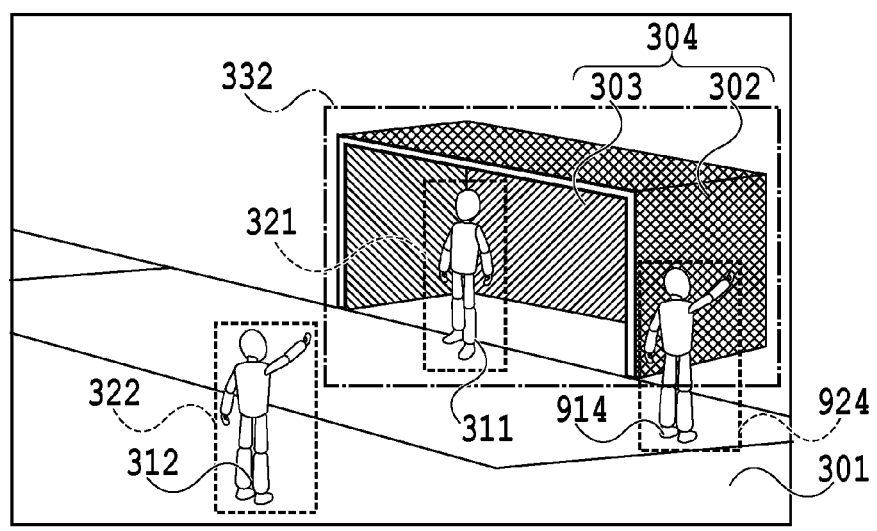
FIG. 9 is a diagram showing an example of the candidate regions to be extracted from the captured image, and the first region and the second region to be set to the captured image.
Figure 10B:
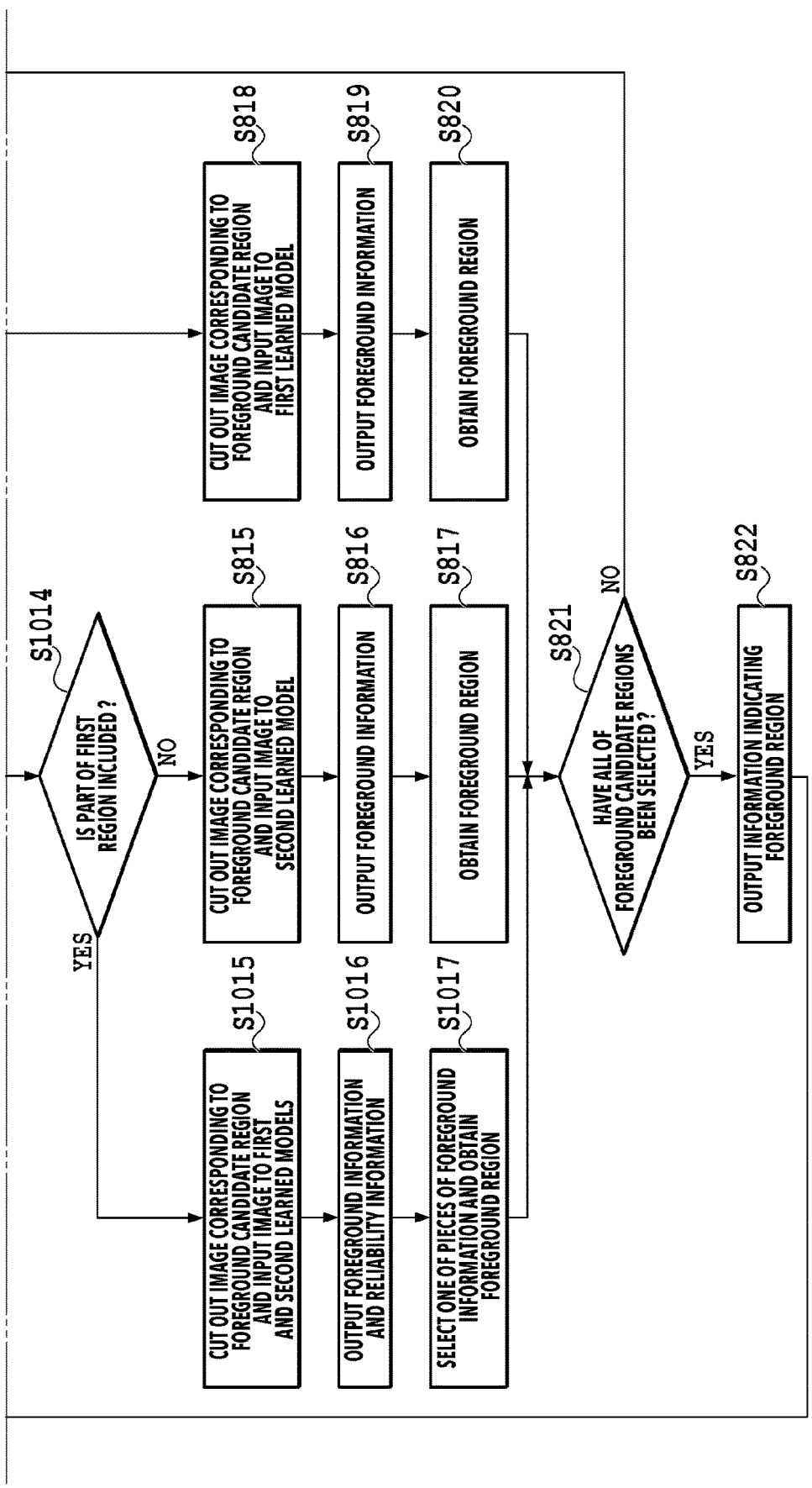
Figure 11:
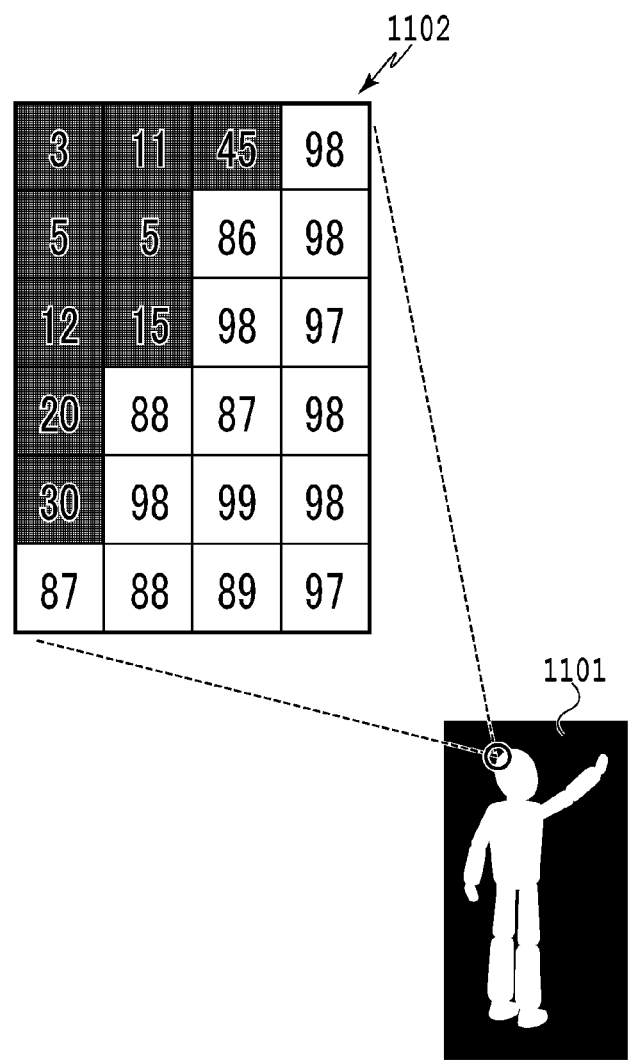
FIG. 11 is a diagram showing an example of a mask image indicating a foreground region to be inferred by using a first learned model or a second learned model according to the second embodiment, and an example of an evaluation value group corresponding to a pixel group of part of the mask image.

A image processing apparatus 100 according to a second embodiment will be described with reference to FIGS. 9 to 11. As with the image processing apparatus 100 according to the first embodiment, the image processing apparatus 100 according to the second embodiment includes the image obtaining unit 110, the setting unit 120, the candidate extraction unit 130, the generating unit 140, the inference unit 150, the foreground obtaining unit 160, and the output unit 170. The respective functional blocks of the generating unit 140, the inference unit 150, the foreground obtaining unit 160, and the output unit 170 included in the image processing apparatus 100 according to the second embodiment have different functions from those of the respective functional blocks included in the image processing apparatus 100 according to the first embodiment.

In the following description, the image processing apparatus 100 according to the second embodiment will be denoted and described as an image processing apparatus 100a in order to distinguish the image processing apparatus 100 according to the first embodiment from the image processing apparatus 100 according to the second embodiment. Likewise, the generating unit 140, the inference unit 150, the foreground obtaining unit 160, and the output unit 170 provided to the image processing apparatus 100a will be denoted and described as a generating unit 140a, an inference unit 150a, a foreground obtaining unit 160a, and an output unit 170a. Meanwhile, as with the image processing system 1 according to the first embodiment, the image processing system 1 according to the second embodiment includes the multiple image capturing devices 10, the multiple image processing apparatuses 100a, and the image computing server 11. The image obtaining unit 110, the setting unit 120, and the candidate extraction unit 130 provided to the image processing apparatus 100a are the same as the image obtaining unit 110, the setting unit 120, and the candidate extraction unit 130 provided to the image processing apparatus 100 according the first embodiment, and explanations thereof will be omitted.

The inference unit 150a is formed from the first and second learned models 151 and 152. The inference unit 150a infers the foreground region being the image region corresponding to the object from the inputted image by using the first and second learned models 151 and 152, and outputs the foreground information as the result of inference. However, the first and second learned models 151 and 152 according to the second embodiment output information (hereinafter referred to as "reliability information") indicating reliability of the inference of the foreground region indicated by the foreground information as the result of inference in addition to the foreground information.

The inference unit 150a inputs the candidate region outputted from the candidate extraction unit 130 as the inputted image to the first and second learned models 151 and 152. Specifically, regarding the candidate region out of the candidate regions, which includes at least part of the first region and includes at least part of the second region, the inference unit 150a inputs the image corresponding to the candidate region to the first learned model and the second learned model 152 as the explanatory variable.

Here, regarding the candidate region out of the candidate regions, which includes at least part of the first region but does not include at least part of the second region, the inference unit 150a inputs the image corresponding to the candidate region to the first learned model 151 as the explanatory variable. The inference unit 150a may input the image corresponding to the candidate region to the first and second learned models 151 and 152 as the explanatory variable. Meanwhile, regarding the candidate region out of the candidate regions, which does not include at least part of the first region but includes at least part of the second region, the inference unit 150*a* inputs the image corresponding to the candidate region to the second learned model 152 as the explanatory variable. The inference unit 150*a* may input the image corresponding to the candidate region to the first and second learned models 151 and 152 as the explanatory variable.

The candidate region that includes at least part of the first region 331 and includes at least part of the second region will be described with reference to FIG. 9. FIG. 9 is a diagram showing an example of candidate regions 321, 322, and 924 to be extracted from a captured image 910, and first region 331 and the second region 332 to be set to the captured image 910. Players 311, 312, and 914 as well as the goal 304 that is supposed to be the background region show up in the captured image 910 illustrated in FIG. 9. The candidate regions 321, 322, and 924 are candidate regions corresponding to the players 311, 312, and 914. For example, the candidate region that includes at least part of the first region 331 and includes at least part of the second region 332 is a candidate region such as the candidate region 924. The candidate region that includes at least part of the first region 331 but does not include at least part of the second region 332 is a candidate region such as the candidate region 322. Meanwhile, the candidate region that does not include at least part of the first region 331 but includes at least part of the second region 332 is a candidate region such as the candidate region 321.

In the case of inputting the image corresponding to the candidate region such as the candidate region 924, at least one of the first and second learned models 151 and 152 may be unable to conduct the inference at high accuracy. Accuracy of inference can be evaluated as reliability of inference. Accordingly, it is possible to select the foreground region having higher accuracy of inference by inputting the image corresponding to the candidate region such as the candidate region 924 to the first and second learned models 151 and 152 and comparing the reliability indicated by the reliability information outputted from each of the learned models. Details of the reliability will be described later.

The foreground obtaining unit 160*a* obtains the information (the foreground information) that indicates the foreground regions in the captured image 910, which are outputted from the inference unit 150*a* as the results of inference, or in other words, outputted from the first and second learned models 151 and 152 as the results of inference. In the case where the inputted image that is outputted from the generating unit 140*a* is inputted to any one of the first and second learned models 151 and 152, the foreground obtaining unit 160*a* obtains the foreground information outputted from the first learned model 151 or the second learned model 152 to which the inputted image is imputed. Moreover, the foreground obtaining unit 160*a* obtains the foreground regions in the inputted image based on the obtained foreground information.

Meanwhile, in the case where the inputted image that is outputted from the generating unit 140*a* is inputted to the first and second learned models 151 and 152, the foreground obtaining unit 160*a* obtains the foreground information and the reliability information outputted from the first learned model 151 and the second learned model 152 as the results of inference. In this case, the foreground obtaining unit 160*a* selects one of the pieces of the foreground information outputted from the first and second learned models 151 and 152 based on the reliability indicated by the reliability information outputted from the first and second learned models 151 and 152. Specifically, in this case, the foreground obtaining unit 160*a* selects the piece of the foreground information having the higher reliability out of the pieces of foreground information outputted from the first and second learned models 151 and 152, and obtains the foreground regions in the inputted image based on the selected foreground information. The output unit 170*a* outputs the information indicating the foreground regions obtained by the foreground obtaining unit 160*a*.

An operation of the image processing apparatus 100*a* will be described with reference to FIG. 10. FIG. 10 is a flowchart showing an example of a processing flow by the image processing apparatus 100 (the image processing apparatus 100*a*) according to the second embodiment. Note that the flowchart shown in FIG. 10 is equivalent to the flowchart shown in FIG. 8 with addition of processing from S1014 to S1017 thereto. In the flowchart shown in FIG. 10, the same processing as the flowchart shown in FIG. 8 will be denoted by the same reference signs and explanations thereof will be omitted.

First, the image processing apparatus 100*a* executes the processing from S801 to S814. In the case where it is determined in S814 that at least part of the candidate region does not include at least part of the second region 332, the image processing apparatus 100*a* executes the processing from S818 to S820. In the case where it is determined in S814 that at least part of the candidate region includes at least part of the second region 332, the generating unit 140*a* determines S1014 whether or not at least part of the selected candidate region includes at least part of the first region 331. The image processing apparatus 100*a* executes the processing from S815 to S817 in the case where it is determined in S1014 that at least part of the candidate region selected by the generating unit 140*a* does not include at least part of the first region 331. The image processing apparatus 100*a* executes processing from S1015 to S1017 in the case where it is determined in S1014 that at least part of the candidate region selected by the generating unit 140*a* includes at least part of the first region 331.

Specifically, the generating unit 140*a* cuts the image corresponding to the candidate region out of the captured image 910 and outputs the cut-out image to the inference unit 150*a* in S1015. Moreover, the inference unit 150*a* inputs this image to the first and second learned models 151 and 152 as the explanatory variable. After S1015, each of the first and second learned models 151 and 152 in the inference unit 150*a* infers the foreground region from the image and outputs the foreground information and the reliability information as the result of inference in S1016. After S1016, the foreground obtaining unit 160*a* obtains the two pieces of foreground information and the two pieces of the reliability information outputted from the inference unit 150*a*, and selects one of the two pieces of foreground information based on the reliability indicated by the respective pieces of the reliability information in S1017. Moreover, the foreground obtaining unit 160*a* obtains the foreground region of the image based on the selected piece of the foreground information. After S817, S820, or S1017, the generating unit 140*a* determines whether or not all of the candidate regions have been selected in S821.

An example of a method of calculating the reliability in the first and second learned models 151 and 152 will be described with reference to FIG. 11. FIG. 11 is a diagram showing an example of a mask image 1101 indicating the foreground region to be inferred by using the first learned model 151 or the second learned model 152, and an example of an evaluation value group 1102 corresponding to a pixel group of part of the mask image 1101. Each evaluation value in the evaluation value group 1102 shown in FIG. 11 is a numerical value obtained by normalizing the evaluation as to whether or not each relevant pixel corresponds to the foreground region on a 100-point scale from 0 to 99.

In the course of inferring the foreground region in the inputted image that is inputted as the explanatory variable, each of the first and second learned models 151 and 152 determines whether or not each pixel in the image corresponds to the foreground region by calculating the evaluation value corresponding to each pixel. For example, in the case where the calculated evaluation value is equal to or above 80, the pixel having the evaluation value is determined to correspond to the foreground region and the pixel is expressed by using a while pixel in the mask image 1101. Likewise, in the case where the calculated evaluation value is below 80, the pixel having the evaluation value is determined to correspond to the background region and the pixel is expressed by using a black pixel in the mask image 1101. Regarding all of the pixels of the inputted image, the first and second learned models 151 and 152 determine whether or not each of the pixels corresponds to the foreground region or the background region, thus estimating the foreground region in the image and outputting the mask image 1101 as the foreground information. Here, each evaluation value is not limited only to the value normalized on the 100-point scale from 0 to 99, but may be based on a scale equal to or below 99 or equal to or above 101. Meanwhile, the threshold of the evaluation value to define the foreground region or the background region is not limited to 80, but may be a value below 80 or above 80.

The first and second learned models 151 and 152 calculate an average value of the evaluation values corresponding to all of the pixels determined as the foreground region as a numerical value that represents the reliability, for example. The higher numerical value representing the reliability means higher reliability of extraction of the extracted foreground region. Note that it is a mere example to define the reliability by using the average value of the evaluation values corresponding to all of the pixels determined as the foreground region. Instead, the reliability may be defined by using a statistics value such as a median value or a mode value of the evaluation values corresponding to all of the pixels determined as the foreground region.

As described above, in the case where the candidate region extends across the first region 331 and the second region 332, the foreground region is estimated by using both the first learned model 151 and the second learned model 152, and one of the foreground regions is selected based on the reliability of estimation thereof. Thus, the image processing apparatus 100a can obtain the foreground region at high accuracy even in the case where the candidate region extends across the first region 331 and the second region 332.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to extract the foreground region from the captured image at high accuracy while suppressing the increase in computation load in the case of extracting the foreground region irrespective of whether or not the specific object shows up in the captured image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-089252, filed May 27, 2021 which is hereby incorporated by reference wherein in its entirety.

What is claimed is:

1. An image processing apparatus comprising:

one or more hardware processors; and one or more memories storing one or more programs configured to be executed by the one or more hardware processors, the one or more programs including instructions for:

setting a first region not including an image region in a captured image where a specific object shows up, and a second region including an image region in the captured image where the specific object shows up; and obtaining a first foreground region indicating a foreground region included in the first region extracted by a first learned model based on the captured image and the first region, and a second foreground region indicating a foreground region included in the second region extracted by a second learned model based on the captured image and the second region; and wherein extraction accuracy of the second foreground region extracted by the second learned model based on the captured image and on the second region is higher than extraction accuracy of the second foreground region extracted by the first learned model based on the captured image and on the second region.

2. The image processing apparatus according to claim 1, wherein the one or more programs further include instructions for:

obtaining the captured image from an image capturing device.

3. The image processing apparatus according to claim 1, wherein
the one or more programs further include instructions for:
extracting a candidate region to be a candidate for the foreground region from the captured image; and wherein
the first learned model extracts the first foreground region based on the candidate region in addition to the captured image and the first region, and
the second learned model extracts the second foreground region based on the candidate region in addition to the captured image and the second region.

4. The image processing apparatus according to claim 1, wherein
the one or more programs further include instructions for:
generating a first image to be inputted to the first learned model based on the captured image and the first region and generating a second image to be inputted to the second learned model based on the captured image and the second region; and wherein
the first learned model extracts the first foreground region based on the first image which is based on the captured image and the first region, and
the second learned model extracts the second foreground region based on the second image which is based on the captured image and the second region.

5. The image processing apparatus according to claim 3, wherein
the one or more programs further include instructions for:
generating a first image to be inputted to the first learned model based on the captured image, the first region, and the candidate region and generating a second image to be inputted to the second learned model based on the captured image, the second region; and wherein the one or more first images to be inputted to the first learned model are generated by cutting regions corresponding, respectively, to the one or more candidate regions each including at least part of the first region out of the captured image, and the one or more second images to be inputted to the second learned model are generated by cutting regions corresponding, respectively, to the one or more candidate regions each including at least part of the second region out of the captured image; and wherein
the first learned model extracts the first foreground region based on the first image which is based on the captured image, the first region, and the candidate region, and
the second learned model extracts the second foreground region based on the second image which is based on the captured image, the second region, and the candidate region.

6. The image processing apparatus according to claim 5, wherein
the first learned model and the second learned model are configured to obtain information indicating reliability of the foreground region in addition to extraction of the foreground region in the image based on an image corresponding to the candidate region, and
regarding the candidate region which includes at least part of the first region and includes at least part of the second region, the image corresponding to the candidate region is inputted to the first learned model and the second learned model, and
the one or more programs further include instructions for:
obtaining information indicating the reliability of the foreground regions in addition to the foreground regions in the images corresponding to the candidate region to be extracted by the first learned model and the second learned model, selecting one of the foreground regions extracted by the first learned model and the second learned model based on the reliability in a case where the image corresponding to an identical candidate region is inputted to the first learned model and the second learned model, and obtaining the selected foreground region as the foreground region of the image corresponding to the candidate region.

7. The image processing apparatus according to claim 4, wherein
the one or more programs further include instructions for:
executing the first learned model and the second learned model; and wherein
the image processing apparatus inputs the first image to the first learned model and inputs the second image to the second learned model, and
the image processing apparatus obtains the first foreground region extracted by the first learned model and the second foreground region extracted by the second learned model.

8. The image processing apparatus according to claim 1, wherein
the first learned model corresponds to a result of learning accomplished by learning which uses an image group including a plurality of learning images as first learning data,
the second learned model corresponds to a result of learning accomplished by learning which uses an image group including a plurality of learning images as second learning data, and
the first learning data and the second learning data include the image groups being different from each other.

9. The image processing apparatus according to claim 8, wherein
the image group being the second learning data includes the more learning images where the specific object shows up as compared to the image group being the first learning data.

10. The image processing apparatus according to claim 8, wherein
the image group being the second learning data has a ratio of pieces of the learning images where the specific object shows up, which is larger than a predetermined ratio.

11. The image processing apparatus according to claim 8, wherein
in a case of causing a second learning model corresponding to the second learned model to perform learning by using the learning images where the specific object shows up as the learning data, the second learned model is a learned model corresponding to a result of learning by causing the second learning model to perform the learning such that a value of a loss function becomes smaller than a value of the loss function in a case of causing a first learning model corresponding to the first learned model to perform learning by using the learning images where the specific object shows up as the learning data.

12. The image processing apparatus according to claim 1, wherein
each of the first learned model and the second learned model is a learned model formed from a neural network.

13. The image processing apparatus according to claim 12, wherein a number of sub-layers of an intermediate layer or a number of neurons in the intermediate layer in the second learned model is larger than a number of sub-layers of an intermediate layer or a number of neurons in the intermediate layer in the first learned model.

14. The image processing apparatus according to claim 1, wherein
the one or more programs further include instructions for:
setting an entire region of the captured image as the second region in a case where the specific object shows up in the captured image, and setting the entire region of the captured image as the first region in a case where the specific object does not show up in the captured image.

15. The image processing apparatus according to claim 1, wherein
the one or more programs further include instructions for:
setting an entire region of the captured image as the second region in a case where the specific object shows up in the captured image and a ratio of an area of the image region corresponding to the specific object to an area of the entire region of the captured image is larger than a predetermined value, and setting the entire region of the captured image as the first region in a case where the specific object does not show up in the captured image or in a case where the specific object shows up in the captured image and the ratio of the area of the image region corresponding to the specific object to the area of the entire region of the captured image is equal to or smaller than the predetermined value.

16. A non-transitory computer readable storage medium storing a program for causing a computer to perform a control method of an image processing apparatus, the control method comprising the steps of:
setting a first region not including an image region in a captured image where a specific object shows up, and a second region including an image region in the captured image where the specific object shows up; and
obtaining a first foreground region indicating a foreground region included in the first region extracted by a first learned model based on the captured image and the first region, and a second foreground region indicating a foreground region included in the second region extracted by a second learned model based on the captured image and the second region; and wherein
extraction accuracy of the second foreground region extracted by the second learned model based on the captured image and on the second region is higher than extraction accuracy of the second foreground region extracted by the first learned model based on the captured image and on the second region.

17. An image processing method comprising the steps of:
setting a first region not including an image region in a captured image where a specific object shows up, and a second region including an image region in the captured image where the specific object shows up; and
obtaining a first foreground region indicating a foreground region included in the first region extracted by a first learned model based on the captured image and the first region, and a second foreground region indicating a foreground region included in the second region extracted by a second learned model based on the captured image and the second region; and wherein
extraction accuracy of the second foreground region extracted by the second learned model based on the captured image and on the second region is higher than extraction accuracy of the second foreground region extracted by the first learned model based on the captured image and on the second region.

* * * * *